C. G. SIGURD.
WEED CUTTER.
APPLICATION FILED SEPT. 5, 1911.
1,010,813.
Patented Dec. 5, 1911.
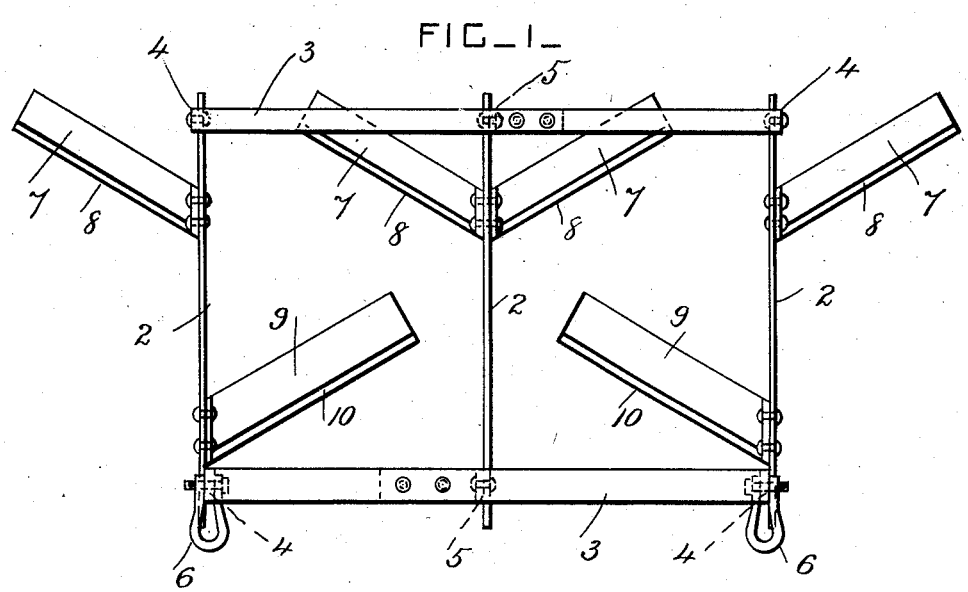
FIG_1_
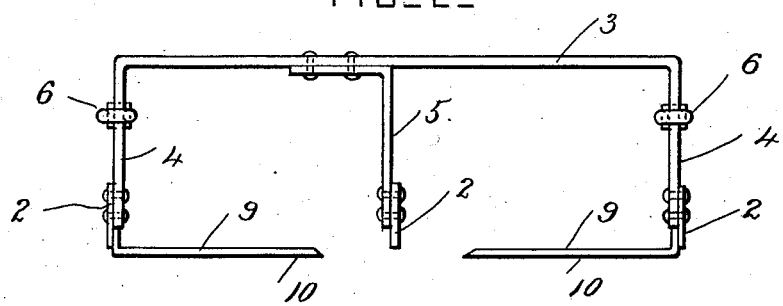
FIG_2_
Witnesses
Chas M Baruch
W. C. Grenley.
Inventor
Carl G. Sigurd,
By Herbert W. T. Jenner.
Attorney

UNITED STATES PATENT OFFICE.

CARL G. SIGURD, OF SAN JOSE, CALIFORNIA.

WEED-CUTTER.

1,010,813. Specification of Letters Patent. Patented Dec. 5, 1911.

Application filed September 5, 1911. Serial No. 647,650.

*To all whom it may concern:*

Be it known that I, CARL G. SIGURD, a citizen of the United States, residing at San Jose, in the county of Santa Clara and State of California, have invented certain new and useful Improvements in Weed-Cutters; and I do hereby declare the following to be a full, clear, and exact description of the invention, such as will enable others skilled in the art to which it appertains to make and use the same.

This invention relates to weed cutters for use on farm or prairie land; and it consists in the novel construction and combination of the parts hereinafter fully described and claimed.

In the drawings, Figure 1 is a plan view of a weed cutter constructed according to this invention. Fig. 2 is a front view of the weed cutter.

The weed cutter is provided with three similar bars 2 placed on edge and arranged parallel to each other at suitable distances apart. Two crossbars 3 are provided and these crossbars have depending arms 4 at their ends for securing them to the outer bars 2. One crossbar is secured at the front end of the bars 2, and the other at their rear end, and both crossbars are arranged above the level of the top edges of the bars 2. Arms 5 are secured to the middle portions of the crossbars 3 and to the middle or central bar 2. The crossbar 3 at the front end of the machine is provided with clevises 6 pivoted to its arms 4, or it may have any other suitable attachments for drawing the machine along.

Outwardly and rearwardly projecting cutting blades 7 are secured to the rear end portions of the bars 2 and have cutting edges 8. Two of these blades 7 are secured to the middle bar 2, and one blade is secured to each outer bar 2. Inwardly and rearwardly projecting blades 9 are secured to the front end portions of the outer bars 2. These blades 9 have cutting edges 10, and they are longer than the blades 7 which are secured to the middle bar 2. The blades 9 are arranged so that their free end portions work in the paths of the two blades 7 which are secured to the middle bar 2. All the blades are arranged to work in a substantially horizontal plane.

The machine is drawn along, and it cuts off the weeds as its cutting edges come in contact with them. It not only cuts off and kills the weeds, but also forms upon the surface of the ground that dust mulch so necessary in arid or semi-arid countries to conserve moisture.

What I claim is:

1. A weed cutter, comprising three parallel bars, crosspieces holding the said bars in position, outwardly and rearwardly projecting cutting blades secured to the rear end portions of the three said bars, and inwardly and rearwardly projecting blades secured to the front end portions of the two outer bars with their free end portions working in the paths of the free end portions of the blades secured to the middle bar.

2. A weed cutter, comprising three parallel bars, crosspieces arranged above the said bars and having arms at their ends and middle parts which are secured to the three said bars, outwardly and rearwardly projecting cutting blades secured to the rear end portions of the three said bars, and inwardly and rearwardly projecting blades secured to the front end portions of the two outer bars with their free end portions working in the paths of the free end portions of the blades secured to the middle bar.

In testimony whereof I have affixed my signature in the presence of two witnesses.

CARL G. SIGURD.

Witnesses:
N. E. WITTMAN,
E. D. WARD.

Copies of this patent may be obtained for five cents each, by addressing the "Commissioner of Patents, Washington, D. C."